United States Patent
Mun et al.

(10) Patent No.: US 11,749,260 B1
(45) Date of Patent: Sep. 5, 2023

(54) METHOD FOR SPEECH RECOGNITION WITH GRAPHEME INFORMATION

(71) Applicant: ActionPower Corp., Seoul (KR)

(72) Inventors: Hwanbok Mun, Seoul (KR); Dongchan Shin, Seoul (KR); Gyujin Kim, Incheon (KR); Seongmin Park, Seoul (KR); Jihwa Lee, Seoul (KR)

(73) Assignee: ACTIONPOWER CORP., Seoul (KR)

( * ) Notice: Subject to any disclaimer, the term of this patent is extended or adjusted under 35 U.S.C. 154(b) by 0 days.

(21) Appl. No.: 17/952,072

(22) Filed: Sep. 23, 2022

(30) Foreign Application Priority Data

Jun. 28, 2022 (KR) .................. 10-2022-0078703

(51) Int. Cl.
*G10L 15/06* (2013.01)
*G10L 15/02* (2006.01)
*G10L 15/16* (2006.01)
*G10L 15/22* (2006.01)
*G10L 15/197* (2013.01)

(52) U.S. Cl.
CPC ............ *G10L 15/063* (2013.01); *G10L 15/02* (2013.01); *G10L 15/16* (2013.01); *G10L 15/197* (2013.01); *G10L 15/22* (2013.01)

(58) Field of Classification Search
CPC ....... G10L 15/063; G10L 15/02; G10L 15/16; G10L 15/197; G10L 15/22
See application file for complete search history.

(56) References Cited

U.S. PATENT DOCUMENTS

| 9,728,185 B2 | 8/2017 | Schalkwyk et al. |
| 10,043,519 B2 | 8/2018 | Schlippe et al. |
| 11,217,231 B2 | 1/2022 | Prabhavalkar et al. |

(Continued)

FOREIGN PATENT DOCUMENTS

| CN | 113436606 A | 9/2021 |
| KR | 10-2020-0091797 A | 7/2020 |

(Continued)

OTHER PUBLICATIONS

Ho Jo et al., "Semi-supervised learning of speech recognizers based on variational autoencoder and unsupervised data augmentation," *The Journal of the Acoustical Society of Korea*, 40(6), 2021. (9 pages).

(Continued)

*Primary Examiner* — Michael Colucci
(74) *Attorney, Agent, or Firm* — Seed IP Law Group LLP

(57) ABSTRACT

Disclosed is a method for speech recognition performed by one or more processors of a computing device. The method includes inputting voice information into an encoder to extract a first feature vector and calculating a first loss function. The method includes inputting the first feature vector extracted from the encoder to a first decoder to perform prediction on the voice information, calculating a second loss function, and extracting a second feature vector. The method includes inputting a second feature vector extracted from the first decoder to a second decoder to perform grapheme-based prediction, and calculating a third loss function. The method includes training at least one of the encoder, the first decoder, or the second decoder based on the first loss function, the second loss function, and the third loss function.

13 Claims, 7 Drawing Sheets

(56) References Cited

U.S. PATENT DOCUMENTS

| | | | |
|---|---|---|---|
| 11,646,019 B2* | 5/2023 | Prabhavalkar | G10L 15/063 704/232 |
| 2020/0234713 A1* | 7/2020 | Gowda | G10L 15/28 |
| 2021/0043195 A1 | 2/2021 | Hahn et al. | |
| 2021/0182662 A1* | 6/2021 | Lai | G06F 40/284 |
| 2021/0225369 A1* | 7/2021 | Hu | G06N 3/044 |
| 2021/0233512 A1* | 7/2021 | Peyser | G06N 3/08 |
| 2022/0101836 A1 | 3/2022 | Prabhavalkar et al. | |
| 2022/0129749 A1* | 4/2022 | Moritz | G06N 3/045 |
| 2022/0310064 A1* | 9/2022 | Shao | G10L 15/18 |

FOREIGN PATENT DOCUMENTS

| | | |
|---|---|---|
| KR | 102152902 B1 | 9/2020 |
| KR | 10-2022-0053491 A | 4/2022 |
| KR | 20220054704 A | 5/2022 |

OTHER PUBLICATIONS

Ihm et al., "End-to-End Korean Speech Synthesis System Using Reformer Network," The Journal of Korean Institute of Communications and Information Sciences, vol. 46 No. 02, Oct. 2020.

* cited by examiner

METHOD FOR SPEECH RECOGNITION WITH GRAPHEME INFORMATION

CROSS-REFERENCE TO RELATED APPLICATIONS

This application claims priority to and the benefit of Korean Patent Application No. 10-2022-0078703 filed in the Korean Intellectual Property Office on Jun. 28, 2022, the entire contents of which are incorporated herein by reference.

BACKGROUND

Technical Field

The present disclosure relates to a method for speech recognition using grapheme information, and more particularly, to a method of improving accuracy of speech recognition by using grapheme information.

Description of the Related Art

Most of the existing speech recognition studies using deep learning use a classification model that recognizes characters or words by receiving human utterance as input. In this case, the unit of the classification model is called a token, and in Korean speech recognition, there was a tendency to use a higher level token, such as a syllable or sub-word of a relatively large unit rather than a token of a grapheme unit.

In the case of Korean, there are a lot of 11,172 possible combinations of all syllables, so when the syllable-based Korean speech recognition model is trained, the top k syllables that are frequently used in real life were treated as a dictionary.

BRIEF SUMMARY

Syllable-level Korean speech recognition requires the ability to distinguish many syllables well. Further, in order to do this, it is beneficial for a speech recognition model to learn pronunciation information for each syllable. However, the classification model treats each syllable as an arbitrary index that does not reflect pronunciation information, so that the speech recognition model only indirectly learns pronunciation information in the process of learning the speech recognition model.

The inventors of the present disclosure have identified the technical problems and shortcomings of the related art such as the above and provided a new speech recognition technology capable of solving these problems identified above and other technical problems in the related art.

One or more embodiments of the present disclosure provide a method of improving accuracy of speech recognition by using grapheme information.

As mentioned above, the technical problem to be achieved by the present disclosure is not limited to the technical problem identified above, and various technical problems may be included within the range obvious to those skilled in the art from the content to be described below.

In order to solve the foregoing, an example embodiment of the present disclosure discloses a method for speech recognition performed by a computing device, the method includes: inputting voice information into an encoder to extract a first feature vector and calculating a first loss function; inputting the first feature vector extracted from the encoder to a first decoder to perform prediction on the voice information, calculating a second loss function, and extracting a second feature vector; inputting a second feature vector extracted from the first decoder to a second decoder to perform grapheme-based prediction, and calculating a third loss function; and training at least one of the encoder, the first decoder, or the second decoder based on the first loss function, the second loss function, and the third loss function.

Alternatively, the second decoder may be used only in the training process, and in an inference process after the training process, speech recognition may be performed based on the encoder and the first decoder.

Alternatively, the encoder, the first decoder, and the second decoder may be all utilized in a training process and an inference operation after the training process, and the first decoder may perform a decoding operation based on the first feature vector extracted from the encoder and a third feature vector extracted from the second decoder. Alternatively, the first loss function may include a Connectionist Temporal Classification (CTC) loss function, and the second loss function and the third loss function each may include a Cross Entropy (CE) loss function.

Alternatively, the first decoder may perform prediction on a letter of a unit larger than the grapheme unit, and the calculating of the second loss function may include: performing subsequent prediction in a prediction unit of the first decoder based on a result of the previous prediction in the prediction unit of the first decoder and the input first feature vector; and calculating the second loss function based on the result of the performed subsequent prediction.

Alternatively, the calculating of the third loss function may include: performing subsequent prediction in the grapheme unit based on a result of a previous prediction in the grapheme unit and the input second feature vector; and calculating the third loss function based on a result of the performed subsequent prediction.

Alternatively, the operation of training at least one of the encoder, the first decoder, or the second decoder based on the first loss function, the second loss function, and the third loss function may include: calculating a final loss function based on the first loss function, the second loss function, and the third loss function; and training at least one of the encoder, the first decoder, or the second decoder to decrease the calculated final loss function.

Alternatively, the calculating of the final loss function based on the first loss function, the second loss function, and the third loss function may include calculating the final loss function by multiplying each of the first loss function, the second loss function, and the third loss function by weights and then performing a sum operation.

Alternatively, the calculating of the final loss function by multiplying each of the first loss function, the second loss function, and the third loss function by weights and then performing the sum operation may include multiplying the second loss function by a weight higher than the weight multiplied to each of the first loss function and the third loss function. In order to implement the foregoing, another example embodiment of the present disclosure discloses a computer program stored in a non-transitory computer readable storage medium, in which when the computer program is executed by one or more processors, the computer program causes the one or more processors to perform operations for speech recognition, the operations including: an operation of inputting voice information into an encoder to extract a first feature vector and calculating a first loss function; an operation of inputting the first feature vector extracted from the encoder to a first decoder to perform prediction on the voice information, calculating a second loss function, and extracting a second feature vector; an operation of inputting a second feature vector extracted from the first decoder to a second decoder to perform grapheme-based prediction, and calculating a third loss function; and an operation of training at least one of the encoder, the first decoder, or the second decoder based on the first loss function, the second loss function, and the third loss function.

In order to implement the foregoing, still another example embodiment of the present disclosure discloses a computing device, including: at least one processor; and a memory, in which said at least one processor may input voice information into an encoder to extract a first feature vector and calculate a first loss function; input the first feature vector extracted from the encoder to a first decoder to perform prediction on the voice information, calculate a second loss function, and extract a second feature vector; input the second feature vector extracted from the first decoder to a second decoder to perform prediction in a grapheme unit, and calculate a third loss function; and train at least one of the encoder, the first decoder, or the second decoder based on the first loss function, the second loss function, and the third loss function.

In order to implement the foregoing, yet another example embodiment of the present disclosure discloses a structure of a neural network model for speech recognition, the structure being implemented by a computing device, the structure of the neural network model including: an encoder for receiving voice information and extracting a first feature vector for the voice information; a first decoder for receiving the extracted first feature vector from the encoder, extracting a second feature vector, and performing a prediction on a letter in a unit larger than a grapheme unit for the voice information; and a second decoder for receiving the extracted second feature vector from the first decoder and performing a prediction in a grapheme unit on the voice information.

Alternatively, the encoder may include a convolution layer and a plurality of conformer layers, the first decoder may include a plurality of transformer layers, and the second decoder may include a plurality of transformer layers.

In order to implement the foregoing, still yet another example embodiment of the present disclosure discloses a speech recognition method performed by a computing device, the speech recognition method including: extracting a first feature vector based on voice information by using an encoder of a pre-trained neural network model; and performing a prediction on the voice information based on the first feature vector extracted by the encoder by using a first decoder of the pre-trained neural network model, in which the pre-trained neural network model corresponds to a model pre-trained in consideration of a loss function associated with a second decoder that performs a prediction in a grapheme unit.

According to the example embodiments of the present disclosure, it is possible to provide the method for speech recognition, and provide the method of improving accuracy of speech recognition by using grapheme information.

DETAILED DESCRIPTION

Figure 1:
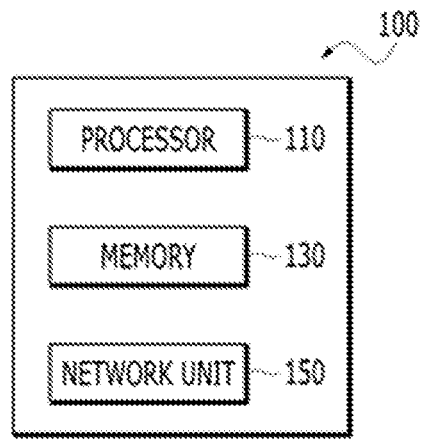
FIG. 1 is a block diagram illustrating a computing device for performing speech recognition according to an example embodiment of the present disclosure.

Various example embodiments will now be described with reference to drawings. In the present specification, various descriptions are presented to provide appreciation of the present disclosure. However, it is apparent that the example embodiments can be executed without the specific description.

"Component," "module," "system," and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A," "a case including only B," and "a case in which A and B are combined."

Those skilled in the art will readily recognize that various illustrative logical blocks, configurations, modules, circuits, means, logic, and algorithm steps described in connection with the example embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented example embodiments is provided so that those skilled in the art of the present disclosure use or implement the present disclosure. Various modifications to the example embodiments will be apparent to those skilled in the art. Generic principles defined herein may be applied to other embodiments without departing from the scope of the present disclosure. Therefore, the present disclosure is not limited to the example embodiments presented herein. The present disclosure should be analyzed within the widest range which is coherent with the principles and new features presented herein.

In the present disclosure, a network function and an artificial neural network and a neural network may be interchangeably used.

FIG. 1 is a block diagram of a computing device for generating a summary of a dialogue according to an example embodiment of the present disclosure.

A configuration of the computing device 100 illustrated in FIG. 1 is only an example shown through simplification. In an example embodiment of the present disclosure, the computing device 100 may include other components for performing a computing environment of the computing device 100 and only some of the disclosed components may constitute the computing device 100.

The computing device 100 may include a processor 110, a memory 130, and a network unit The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an example embodiment of the present disclosure. According to an example embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an example embodiment of the present disclosure, processors of a plurality of computing devices may be used together to process the learning of the network function and the data classification using the network function. Further, the computer program executed in the computing device according to an example embodiment of the present disclosure may be a CPU, GPGPU, or TPU executable program.

A processor 110 according to an example embodiment of the present disclosure may perform operations of recognizing voice information for performing speech recognition, inputting the voice information to an encoder to extract a first feature vector, and calculating a first loss function. In this case, the voice information may be information about a variable-length voice signal or a spectrogram obtained by converting a voice signal through Fourier transform. The voice information may include various information in addition to these examples.

According to the example embodiment of the present disclosure, the processor 110 may input the first feature vector extracted from the encoder to a first decoder to perform prediction on the voice information, and calculate a second loss function to extract a second feature vector. In addition, the processor 110 may input the second feature vector extracted from the first decoder to a second decoder to perform grapheme-based prediction, calculate a third loss function, and perform training of at least one of the encoder, the first decoder, and the second decoder based on the first function, the second loss function, and the third loss function.

According to an example embodiment of the present disclosure, the memory 130 may store any type of information generated or determined by the processor 110 and any type of information received by the network unit 150.

According to an example embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an example embodiment of the present disclosure may use an arbitrary type known wired/wireless communication systems.

For example, the network unit 150 may receive voice information from an external system. In this case, the information received from the database may be data for learning or data for inference for performing speech recognition using grapheme information. The voice information may include the information of the above-described examples, but is not limited to the above-described examples, and may be variously configured within a range that a person skilled in the art can understand.

The network unit 150 may transmit and receive information processed by the processor 110, a user interface, etc., through communication with the other terminal. For example, the network unit 150 may provide the user interface generated by the processor 110 to a client (e.g., a user terminal). Further, the network unit 150 may receive an external input of a user applied to the client and deliver the received external input to the processor 110. In this case, the processor 110 may process operations such as output, modification, change, addition, etc., of information provided through the user interface based on the external input of the user delivered from the network unit 150. In the meantime, the computing device 100 according to the example embodiment of the present disclosure is a computing system for transceiving information with the client through communication and may include a server. In this case, the client may be a predetermined type of terminal accessible to the server. For example, the computing device 100 as a server may receive information for performing speech recognition from an external database, generate a speech recognition result, and provide a user interface related to the speech recognition result to a user terminal. In this case, the user terminal may output the user interface received from the computing device 100 that is the server, and receive or process information through interaction with the user.

In an additional example embodiment, the computing device 100 may also include any type of terminal that performs additional information processing by receiving a data resource generated in any server.

Figure 2:
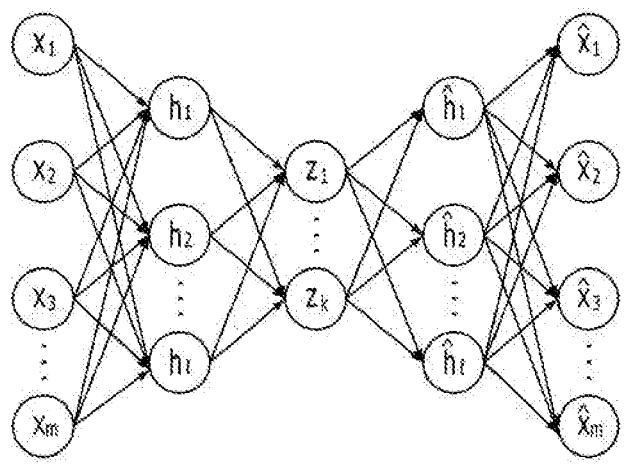
FIG. 2 is a schematic diagram illustrating a network function according to an example embodiment of the present disclosure.

FIG. 2 is a schematic diagram illustrating a network function according to an example embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an example embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another example embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another example embodiment of the present disclosure, the number of nodes of the input layer may be larger than the number of nodes of the output layer, and the neural network may be a neural network of a type in which the number of nodes increases from the input layer to the hidden layer. The neural network according to still yet another example embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an example embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to reduce or minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (e.g., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (e.g., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Figure 3:
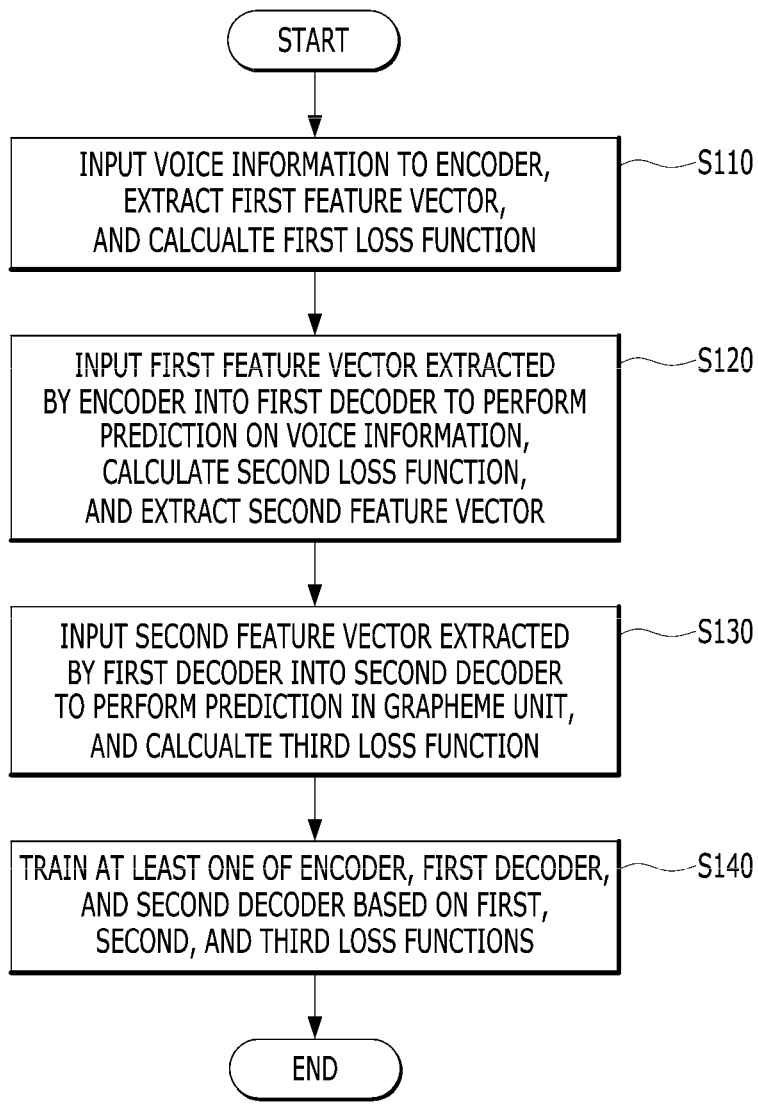
FIG. 3 is a flowchart illustrating a method of training a neural network model for speech recognition according to an example embodiment of the present disclosure.

FIG. 3 is a flowchart illustrating a method of training a neural network model for speech recognition according to an example embodiment of the present disclosure.

The computing device 100 according to the example embodiment of the present disclosure may directly obtain "voice information for performing speech recognition by using grapheme information" or receive "voice information for performing speech recognition by using grapheme information" from an external system. Voice information is information that is a target for training a neural network model for speech recognition according to the example embodiment of the present disclosure. The external system may be a server, a database, or the like that stores and manages voice information. The computing device 100 may use voice information directly acquired or received from an external system as "input data for training the neural network model for speech recognition."

The computing device 100 may input voice information to an encoder, extract a first feature vector, and calculate a first loss function (S110). For example, the computing device 100 may extract the first feature vector by inputting voice information into the encoder and extracting information useful for speech recognition, and the computing device 100 may calculate the first loss function so that the encoder extracts more information useful for the speech recognition. In this case, the first loss function may include a Connectionist Temporal Classification (CTC) loss function. A detailed process in which the first feature vector is extracted and the first loss function is calculated will be described later with reference to FIG. 5.

The computing device 100 may input the first feature vector extracted from the encoder through operation S110 to the first decoder and perform prediction on voice information, and calculate a second loss function and extract a second feature vector (S120). For example, the computing device 100 may input the extracted first feature vector to the first decoder, and predict a letter (for example, a syllable unit and a character unit) larger than the grapheme unit. In addition, the computing device 100 may perform subsequent prediction in a prediction unit of the first decoder based on the result of the previous result in the prediction unit of the first decoder and the input first feature vector, and calculate the second loss function based on a result of the performed subsequent prediction. In this case, the second loss function may include a Cross Entropy (CE) loss function. A detailed process in which the prediction of voice information is performed, the second feature vector is extracted, and the second loss function is calculated will be described later with reference to FIG. 6.

The computing device 100 may perform prediction in the grapheme unit by inputting the second feature vector extracted from the first decoder to the second decoder through operation S120, and calculate a third loss function (S130). For example, the computing device 100 may perform subsequent prediction in the grapheme unit based on the result of the previous prediction in the grapheme unit and the input second feature vector, and calculate the third loss function based on the result of the performed subsequent prediction. In this case, the third loss function may include a Cross Entropy (CE) loss function. A detailed process in which the prediction in the grapheme unit is performed and the third loss function is calculated will be described later with reference to FIG. 7. In addition, a grapheme means the smallest unit that can be semantically distinguished in the letter system of a certain language, and may include cases called "seogiso" and "munjaso" in Korean.

The computing device 100 may train at least one of the encoder, the first decoder, and the second decoder based on the first loss function calculated through operation S110, the second loss function calculated through operation S120, or the third loss function calculated through operation S130 (S140). For example, the computing device 100 calculates a final loss function based on the first loss function, the second loss function, and the third loss function, and train at least one of the encoder, the first decoder, and the second decoder so as to decrease the calculated final loss function. Specifically, the final loss function may be calculated by multiplying each of the first loss function, the second loss function, and the third loss function by weights and then performing a sum operation. In addition, according to another example embodiment, when the sum operation is performed after each of the first loss function, the second loss function, and the third loss function is multiplied by weights, a weight higher than the weight multiplied to each of the first loss and the third loss may be multiplied to the second loss function. After operation S140, the computing device 100 may also perform prediction on voice information by using the trained neural network model, and a specific example embodiment will be described later with reference to FIG. 8.

Figure 4:
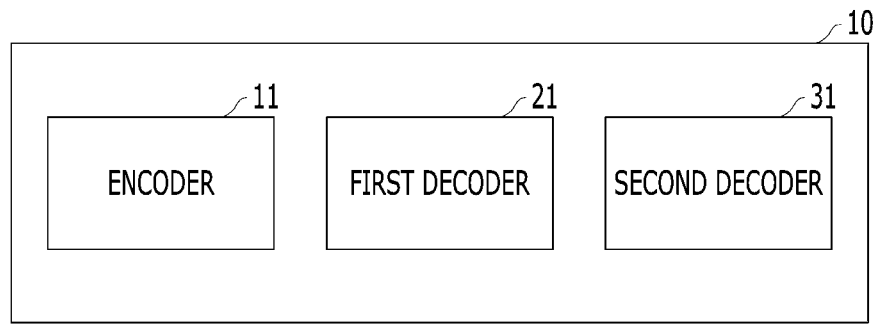
FIG. 4 is a block diagram illustrating a neural network model for performing speech recognition according to an example embodiment of the present disclosure.

FIG. 4 is a block diagram illustrating a neural network model for performing speech recognition according to an example embodiment of the present disclosure. Referring to FIG. 4, a neural network model 10 for speech recognition according to the example embodiment of the present disclosure is an encoder 11 for receiving voice information and extracting a first feature vector for the voice information, a first decoder 21 for receiving the extracted first feature vector from the encoder 11, extracting a second feature vector, and predicting a letter in a unit larger than a grapheme unit for the voice information, and a second decoder 31 for receiving the second feature vector extracted from the first decoder 21 and performing grapheme-based prediction on the voice information. Further, the first decoder 21 and the second decoder 31 may include a plurality of transformer layers. According to the example embodiment of the present disclosure, the second decoder is used only in a learning process, and in an inference process after the learning process, speech recognition may be performed based on the encoder 11 and the first decoder 21. In addition, according to another example embodiment of the present disclosure, the encoder, the first decoder, and the second decoder may be utilized in both a learning process and an inference operation after the learning process, and the first decoder 21 may perform a decoding operation based on the first feature vector extracted from the encoder 11 and the third feature vector extracted from the second decoder 31. Specific embodiments of the encoder 11, the first decoder 21, and the second decoder 31 will be described later with reference to FIGS. 5 to 7.

Figure 5:
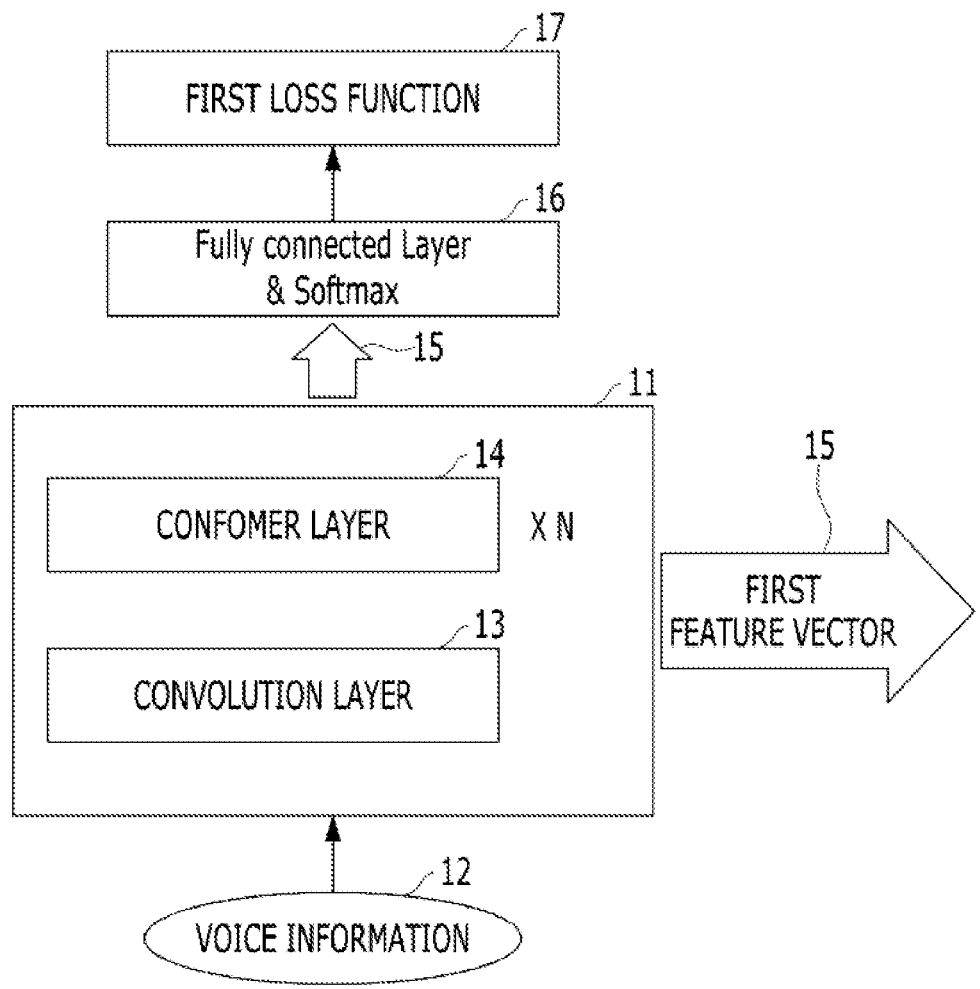
FIG. 5 is a schematic diagram illustrating an operation of inputting voice information into an encoder to extract a first feature vector and calculating a first loss function according to an example embodiment of the present disclosure.

FIG. 5 is a schematic diagram illustrating an operation of inputting voice information into an encoder to extract a first feature vector and calculating a first loss function according to an example embodiment of the present disclosure.

According to the example embodiment of the present disclosure, the computing device 100 may input voice information 12 into the encoder 11 to extract a first feature vector 15 and calculate a first loss function 17. Herein, the encoder 11 may include a convolution layer 13 and a plurality of conformer layers 14. In addition, the encoder 11 may perform subsampling by receiving the voice information 12 as an input and primarily compressing a long voice signal and a spectrogram by using the convolution layer 13. Thereafter, the first feature vector 15 is extracted from the compressed voice information while passing through a conformer layer 14. In the extraction process, information irrelevant to the speech recognition may be excluded, and only information useful for the speech recognition may be extracted. The first feature vector 15 may include information useful for the speech recognition among the voice information, and may be used for prediction of voice information by the first decoder 21 through attention. According to the example embodiment of the present disclosure, the first loss function 17 may include a CTC loss function. The first loss function 17 may be used for learning "unsegmented sequence data in which only the class labels are in order in the training data and the location of each class is unknown." After that, when the first feature vector 15, which is the output of the encoder 11, passes through a Fully-Connected layer & Softmax 16, classification may be determined, and the class with the highest probability may be classified as an output through the Softmax function. Referring to FIG. 5, the first loss function 17 may be calculated based on the output classified through the Fully-Connected layer and the Softmax function 16, and the calculated first loss function 17 may be used as a loss function that only affects the encoder and allows the encoder to better extract useful information for the speech recognition. The process in which the first feature vector 15 extracted from the encoder 11 is input to the decoder and the prediction is performed on the voice information will be described in detail with reference to FIG. 6 below.

Figure 6:
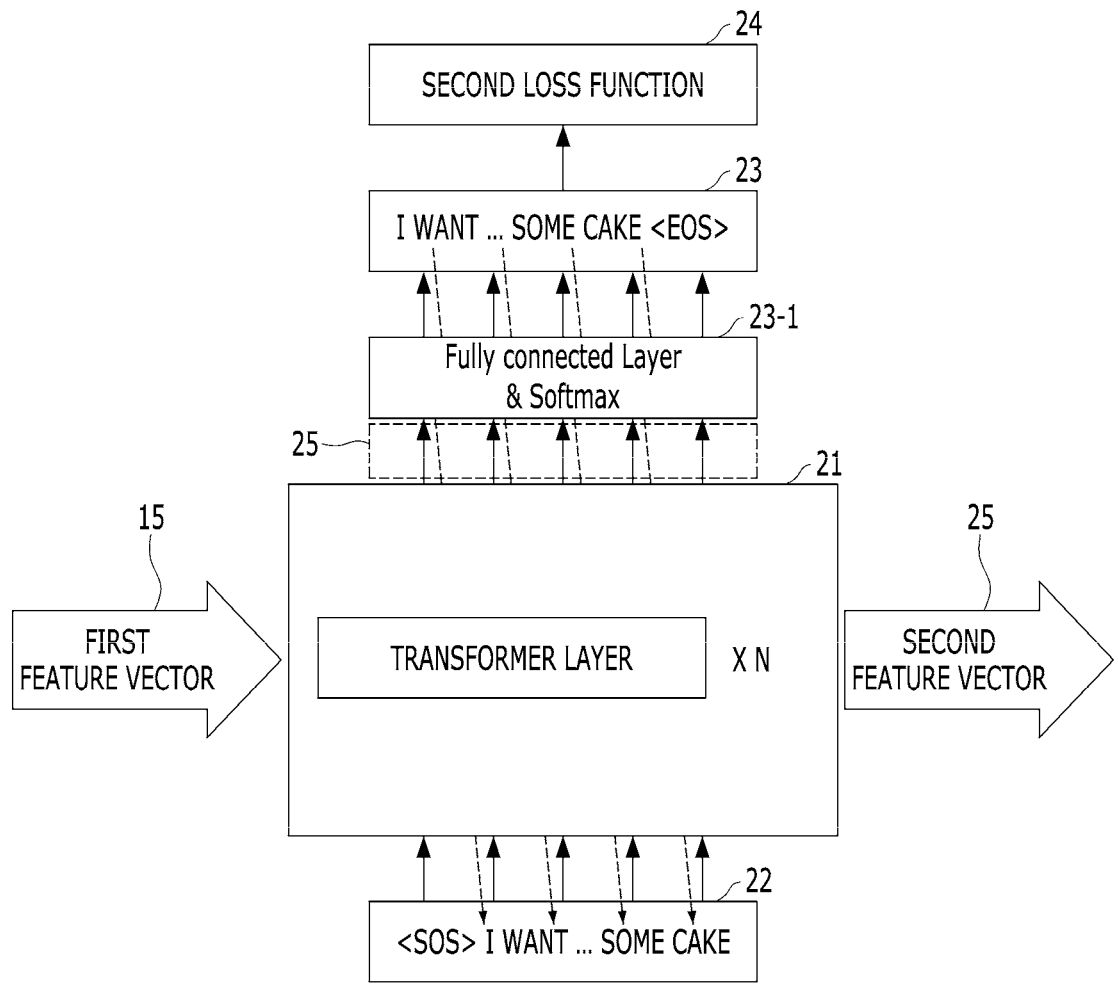
FIG. 6 is a schematic diagram illustrating an operation of predicting the voice information by inputting the first feature vector extracted from the encoder to a first decoder, calculating a second loss function, and extracting a second feature vector according to an example embodiment of the present disclosure.

FIG. 6 is a schematic diagram illustrating an operation of predicting the voice information by inputting the first feature vector extracted from the encoder to a first decoder, calculating a second loss function, and extracting a second feature vector according to an example embodiment of the present disclosure.

According to the example embodiment of the present disclosure, the computing device 100 may input the first feature vector 15 to the first decoder 21 to perform prediction on the voice information (for example, perform the prediction on a letter in character units), calculate a second loss function 24, and extract a second feature vector 25. The extracted second feature vector 25 may include complex information in which language information (for example, context information or the previously predicted character information in letter units) is combined with the first feature vector 15. Specifically, the first decoder 21 may perform prediction on a letter of a unit larger than the grapheme unit, perform subsequent prediction in the prediction unit of the first decoder 21 based on a result 22 of the previous prediction performed in the prediction unit of the first decoder 21 and the input first feature vector 15, and calculate the second loss function 24 based on a result 23 of the performed subsequent prediction.

For example, referring to FIG. 6, when <SOS>, which is a start token, is input to the first decoder 21, a feature vector a may be extracted and prediction may be performed on the letter of the character unit [I] through the Fully connected Layer & Softmax 23-1. In this case, the prediction result [I] may be input again as the result 22 of the previous prediction to the first decoder 21, and the re-input result 21 of the previous prediction and the input first feature vector 15, subsequent prediction in units of characters may be performed. Specifically, a feature vector b is extracted, and [want] may be derived as a result 23 of the subsequent prediction through the Fully connected Layer & Softmax 23-1. When this process is completed, several feature vectors including the feature vector a and the feature vector b are generated, and when these feature vectors are concatenated, the second feature vector 25 may be extracted.

With reference to FIG. 6, characters and Korean are only disclosed as examples of letters having a larger unit than the grapheme unit, and the example embodiments according to the present disclosure are not limited to the prediction of Korean and characters. Foreign languages other than Korean, such as English and Spanish, may be included, and the letters in units larger than the grapheme unit may include letters in chunk units, letters in sub-word units, letters in word units, letters in phrase units, and letters in clause units, and letters in sentence units.

For example, the prediction unit of the first decoder 21 may be a character (or syllable) and the prediction unit of the second decoder 31 may be a grapheme, but the prediction unit is not limited thereto, and when the prediction unit of the first decoder is a letter of a higher layer unit than the prediction unit of the second decoder, the proposed speech recognition method may be applied.

For example, even when the prediction unit of the first decoder is a sub-word and the prediction unit of the second decoder is a character, the proposed speech recognition method may be applied. As another example, even when the prediction unit of the first decoder is a sub-word and the prediction unit of the second decoder is a grapheme, the proposed speech recognition method may be applied.

The second loss function 24 may be calculated based on the result 23 of the subsequent prediction. For example, the second loss function 24 may include a Cross Entropy (CE) loss function. Herein, the CE loss function is the loss function used in the deep learning model to solve the classification problem. In speech recognition, the speech recognition model is used to train the model to predict (classify) the correct characters. The second loss function 24 is calculated based on the result 23 of the subsequent prediction, which is the output of the first decoder 21, but the encoder 11 and the first decoder 21 are connected in the process of receiving the first feature vector 15, so that the second loss function 24 calculated by the first decoder 21 may also affect the training of the encoder 11. In this case, the encoder 11 may be trained to better predict the letter by the first decoder 21 based on the first feature vector 15 output by the encoder. Accordingly, the encoder 11 is affected by all of the first loss function 17, the second loss function 24, and the third loss function, and the first decoder 21 and the second decoder 31 are not affected by the first loss function 17.

Next, the process in which the second feature vector 25 extracted by the first decoder 21 is used for prediction of the second decoder 31 will be described in detail with reference to FIG. 7.

Figure 7:
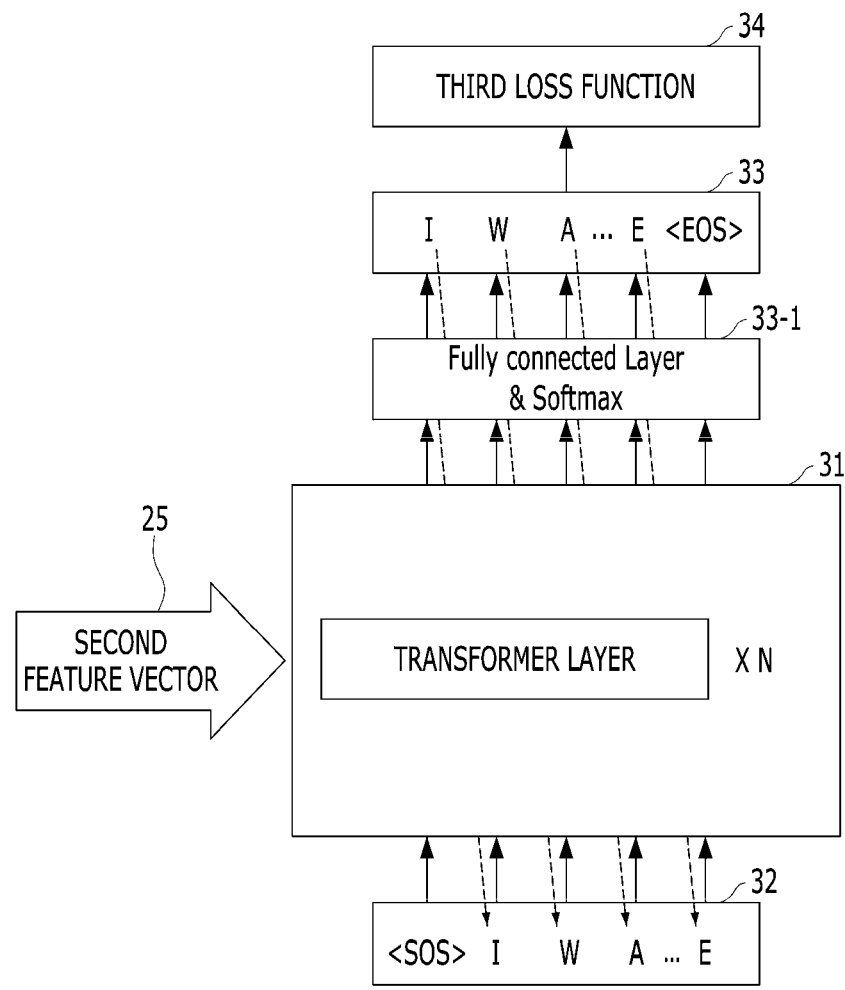
FIG. 7 is a schematic diagram illustrating an operation of inputting the second feature vector extracted from the first decoder to a second decoder, performing grapheme-based prediction, and calculating a third loss function.

FIG. 7 is a schematic diagram illustrating an operation of inputting the second feature vector extracted from the first decoder to a second decoder, performing grapheme-based prediction, and calculating a third loss function.

According to the example embodiment of the present disclosure, the computing device 100 may input the second feature vector 25 to the second decoder 31 to perform grapheme-based prediction and calculate a third loss function 34. Specifically, the second decoder 31 performs subsequent prediction in grapheme units based on a result 32 of the previous prediction in grapheme units and the input second feature vector 25, and the third loss function 34 may be calculated based on a result 33 of the performed subsequent prediction.

For example, referring to FIG. 7, when <SOS>, which is a start token, is input to the second decoder 31, prediction is performed on the letter [I] in the grapheme unit through the Fully connected Layer & Softmax 33-1. At this time, the [I], which is the result of the prediction, may be input to the second decoder 31 again as the result 32 the previous prediction, and a subsequent prediction in grapheme units may be performed based on the re-input result 32 of the previous prediction and the input second feature vector 25, and [w] may be derived as the result 33 of the subsequent prediction through the Fully connected Layer & Softmax 33-1. In addition, English is simply disclosed as an example of the letters of the grapheme unit, and the present disclosure is not limited to the prediction for English, and foreign languages other than English, such as Korean and Spanish, may be included.

The third loss function 34 may include a CE loss function. The third loss function 34 is calculated based on the result 33 of the subsequent prediction, which is the output of the second decoder 31, but the first decoder 21 and the second decoder 31 are connected in the process of receiving the second feature vector 25, and the encoder 11 and the first decoder 21 are connected in the process of receiving the first feature vector 15, so that the third loss function 34 calculated by the second decoder 31 may also affect the training of the first decoder 21 and the encoder 11. Through this, the first decoder 21 capable of extracting information even in the grapheme unit may perform speech recognition more accurately based on information including not only the first loss function 17 and the second loss function 24 but also the third loss function 34.

Additionally, according to the example embodiment of the present disclosure, the computing device 100 may train at least one of the encoder, the first decoder, and the second decoder based on the first loss function, the second loss function, and the third loss function. For example, the computing device 100 may train at least one of the encoder 11, the first decoder 21, or the second decoder 31 so as to calculate a final loss function based on the first loss function 17, the second loss function 24, and the third loss function 34, and decrease the calculated final loss function. The final loss function may be calculated by multiplying each the first loss function, the second loss function, and the third loss function by a weight and then performing a sum operation. The final loss function is expressed by Equation 1 below.

EQUATION 1

Final loss function=αfirst loss function+βsecond loss function +γthird loss function In the case of training at least one of the encoder 11, the first decoder 21, or the second decoder 31, the encoder 11, the first decoder 21, or the second decoder 31 may be trained by assigning appropriate weights to the first loss function 17, the second loss function 24, and the third loss function 34 and may be trained so as to decrease the final loss function. In addition, since the first decoder 21 directly performs the speech recognition, according to another example embodiment of the present disclosure, in the process of calculating the final loss function, the second loss function 24 may be multiplied by a weight higher than the weight multiplied to the first loss function 17 and the third loss function 34. Through this, the influence of the first decoder 21 in the training process may be greater than that of the second decoder 31. The process of performing the prediction on the voice information by using the neural network model pre-trained through the training process is specifically disclosed with reference to FIG. 8 below.

Figure 8:
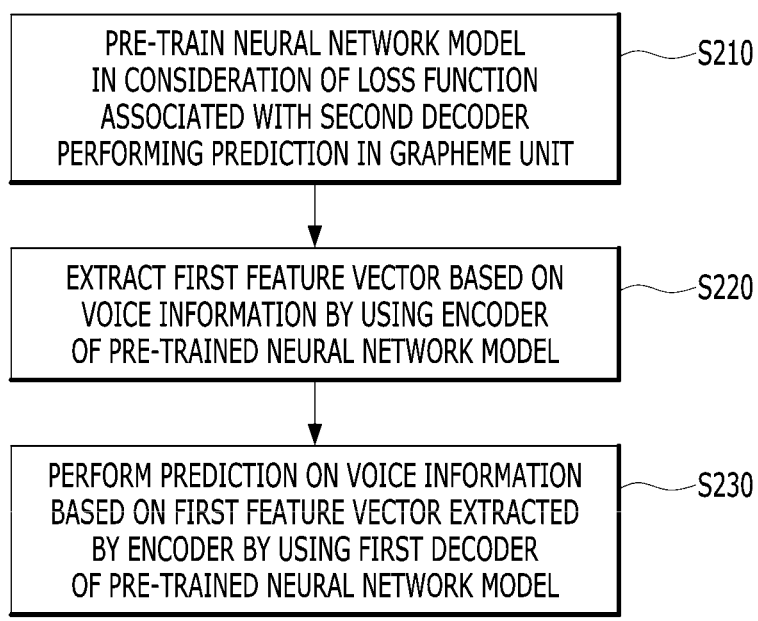
FIG. 8 is a flowchart illustrating a method of performing prediction on voice information by using a pre-trained neural network model according to an example embodiment of the present disclosure.

FIG. 8 is a flowchart illustrating a method of performing prediction on voice information by using a pre-trained neural network model according to an example embodiment of the present disclosure.

Referring to FIG. 8, a neural network model may be pre-trained in consideration of the loss function associated with the second decoder 31 performing grapheme-based prediction according to the example embodiment of the present disclosure (S210). Specifically, the neural network model in which the second decoder 31 capable of performing a grapheme analysis is added to the structure of the encoder 11 and the first decoder 21 learns the data, so that Auto Speech Recognition (ASR) performance of the first decoder may be improved. In the process of decreasing the third loss function 34 of the second decoder 31, even the first decoder 21 is affected, so that the first decoder 21 may be trained to extract and utilize information even in the grapheme unit. For example, in the training process of the neural network model, the first decoder 21 is trained to reduce the final loss function (=Final loss function=αfirst loss function+βsecond loss function+γthird loss function) by reflecting the third loss function 34 of the second decoder 31 capable of performing grapheme analysis, so that accuracy of the first decoder 21 utilized for speech recognition may be improved. In addition, the present disclosure is not limited to the English for the input voice, and may be applied to all cases where speech recognition is performed with a letter which is composed of grapheme to be completed as one character.

According to the example embodiment of the present disclosure, the first feature vector 15 may be extracted based on the voice information by using the encoder 11 of the neural network model pre-trained through operation S210 (S220), and prediction of the voice information may be performed based on the first feature vector 15 extracted from the encoder 11 through operation S220 by using the first decoder 21 of the pre-trained neural network model (S230).

For example, in the inference process, the second decoder 31 is removed, and only the encoder 11 and the first decoder 21 are used to perform prediction on voice information, and in order to measure prediction performance, Character Error Rate (CER) may be used. The table below represents the comparison of the CER change of the prediction method according to the "weight assigned to the training process by using the second decoder 31."

| CER Change According to the Presence or Absence of Training by Using the Second Decoder | | | |
|---|---|---|---|
| | Short | Medium | Long |
| Baseline ($\gamma = 0$) | 0.1405 | 0.1385 | 0.1360 |
| Proposed ($\gamma = 0.5$) | 0.1343 | 0.1291 | 0.1267 |

Referring to the table above, it can be seen that by using a method of performing prior training by using the second decoder 31 using grapheme information and performing prediction on voice information based on the pre-training, it is possible to achieve the effect in improving the CER, which is an error evaluation index, compared with the method of performing the prediction which does not use the second decoder 31. In addition, in the example embodiment, grapheme information is utilized by using the second decoder 31 only in the training process, so that it is possible to obtain technical effects in that an additional network may not be used for inference, the amount of computation also does not increase, when the pre-trained neural network model distinguishes characters with similar pronunciation, it is possible to clearly interpret each component of the initial/neutral/final voice, it is possible to clearly distinguish the characters through the difference between the components, and it is possible to improve performance for character classification problems.

Additionally, according to another example embodiment of the present disclosure, all of the encoder 11, the first decoder 21, and the second decoder 31 may be utilized in the inference process. For example, the voice information 12 may be input to the encoder 11, the first feature vector 15 may be extracted, and the extracted first feature vector 15 may be input to the second decoder 31. In this case, the second decoder 31 may extract the third feature vector together with the output of speech recognition in grapheme units. The extracted third feature vector may be input to the first decoder 21 and used for prediction of the voice information 12. Specifically, the voice information is input and the encoder 11 extracts the first feature vector 15 of the utterance "I want to eat some cake," and a third feature vector may be obtained along with the output of the grapheme unit of "I w a n t t o e a t s o m e c a k e" by using the first feature vector 15 extracted from the encoder 11 by the second decoder 31. The first decoder 21 may output a speech recognition result of "I want to eat some cake" based on the output in the grapheme unit and the third feature vector. As such, by using the second decoder 31 in the inference process, grapheme information may be utilized in the process in which the first decoder 21 performs speech recognition.

Disclosed is a computer readable medium storing the data structure according to an example embodiment of the present disclosure. The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning. Hereinafter, the computation model, the neural network, the network function, and the neural network will be integrated and described as the neural network. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 9:
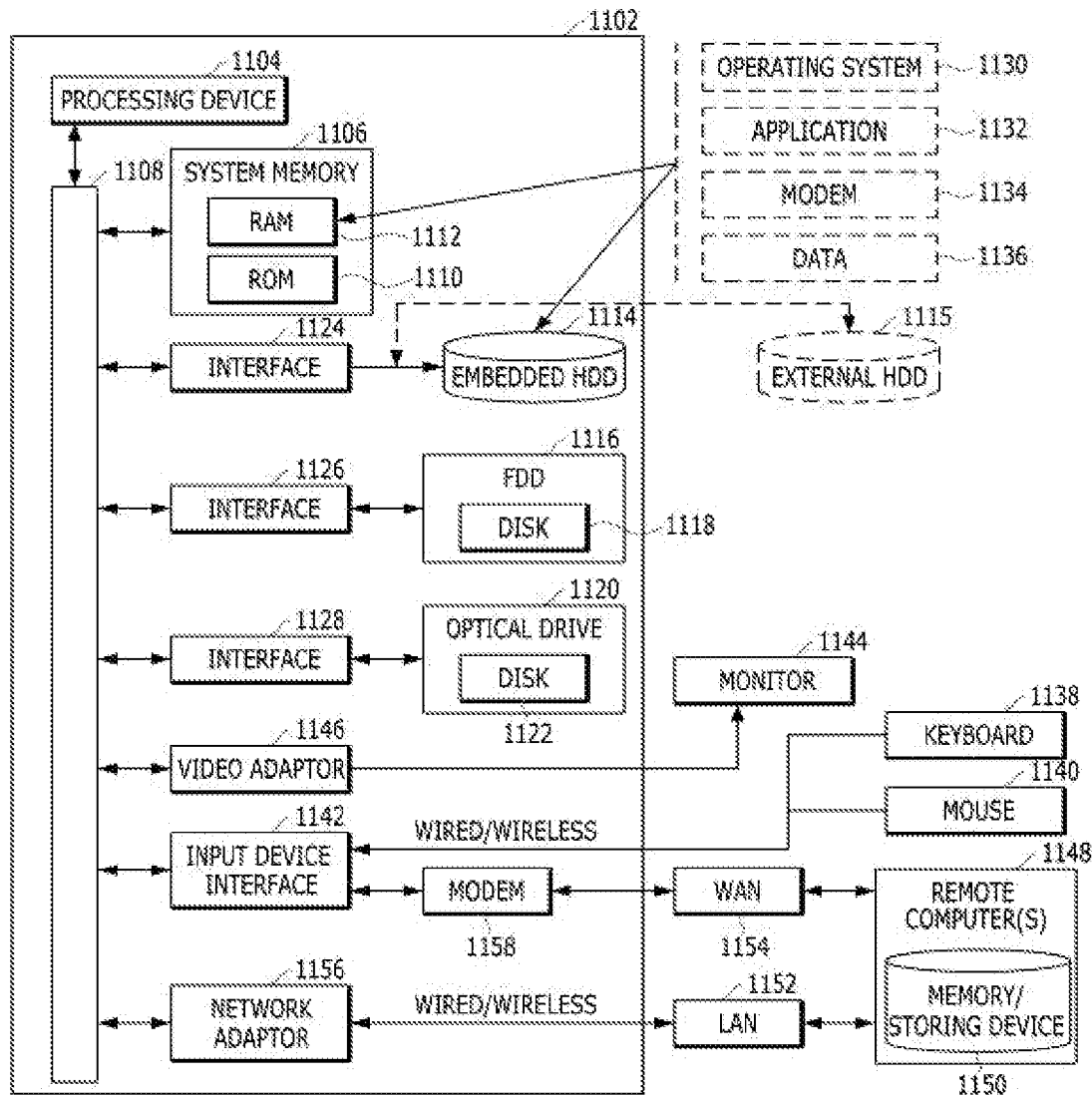
FIG. 9 is a simple and general schematic diagram illustrating an example of a computing environment in which example embodiments of the present disclosure are implementable.

FIG. 9 is a normal and schematic view of an example computing environment in which the example embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The example embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An example environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an example operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is example and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various example logical blocks, modules, processors, means, circuits, and algorithm steps described in association with the example embodiments disclosed herein may be implemented by electronic hardware, various types of programs or design codes (for easy description, herein, designated as software), or a combination of all of them. In order to clearly describe the intercompatibility of the hardware and the software, various example components, blocks, modules, circuits, and steps have been generally described above in association with functions thereof. Whether the functions are implemented as the hardware or software depends on design restrictions given to a specific application and an entire system.

Those skilled in the art of the present disclosure may implement functions described by various methods with respect to each specific application, but it should not be interpreted that the implementation determination departs from the scope of the present disclosure.

Various example embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of example accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented example embodiments is provided so that those skilled in the art of the present disclosure use or implement the present disclosure. Various modifications of the example embodiments will be apparent to those skilled in the art and general principles defined herein can be applied to other example embodiments without departing from the scope of the present disclosure. Therefore, the present disclosure is not limited to the example embodiments presented herein, but should be interpreted within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for speech recognition performed by a computing device, the method comprising:
inputting voice information into an encoder to extract a first feature vector and calculating a first loss function;
inputting the first feature vector extracted from the encoder to a first decoder to perform prediction on the voice information, calculating a second loss function, and extracting a second feature vector;
inputting the second feature vector extracted from the first decoder to a second decoder to perform grapheme-based prediction, and calculating a third loss function;
calculating a final loss function based on the first loss function, the second loss function, and the third loss function; and
training at least one of the encoder, the first decoder, or the second decoder to decease the calculated final loss function.

2. The method of claim 1, wherein the second decoder is used only in the training process, and
wherein in an inference process after the training process, speech recognition is performed based on the encoder and the first decoder.

3. The method of claim 1, wherein the encoder, the first decoder, and the second decoder are all utilized in a training process and an inference operation after the training process, and
wherein the first decoder performs a decoding operation based on the first feature vector extracted from the encoder and a third feature vector extracted from the second decoder.

4. The method of claim 1, wherein the first loss function includes a Connectionist Temporal Classification (CTC) loss function, and
wherein the second loss function and the third loss function each include a Cross Entropy (CE) loss function.

5. The method of claim 1, wherein the first decoder performs prediction on a letter of a unit larger than the grapheme unit, and
wherein the calculating of the second loss function includes:
performing subsequent prediction in a prediction unit of the first decoder based on a result of the previous prediction in the prediction unit of the first decoder and the input first feature vector; and
calculating the second loss function based on the result of the performed subsequent prediction.

6. The method of claim 1, wherein the calculating of the third loss function includes:
performing subsequent prediction in the grapheme unit based on a result of a previous prediction in the grapheme unit and the input second feature vector; and
calculating the third loss function based on a result of the performed subsequent prediction.

7. The method of claim 1, wherein the calculating of the final loss function based on the first loss function, the second loss function, and the third loss function includes:
calculating the final loss function by multiplying each of the first loss function, the second loss function, and the third loss function by weights and then performing a sum operation.

8. The method of claim 7, wherein the calculating of the final loss function by multiplying each of the first loss function, the second loss function, and the third loss function by weights and then performing the sum operation includes:
multiplying the second loss function by a weight higher than the weight multiplied to each of the first loss function and the third loss function.

9. A computer program stored in a non-transitory computer readable storage medium, wherein the computer program causes one or more processors to perform operations for speech recognition when the computer program is executed by the one or more processors, the operations comprising:

inputting voice information into an encoder to extract a first feature vector and calculating a first loss function;

inputting the first feature vector extracted from the encoder to a first decoder to perform prediction on the voice information, calculating a second loss function, and extracting a second feature vector;

inputting the second feature vector extracted from the first decoder to a second decoder to perform grapheme-based prediction, and calculating a third loss function calculating a final loss function based on the first loss function, the second loss function, and the third loss function, and training at least one of the encoder, the first decoder, or the second decoder to decease the calculated final loss function.

10. A computing device, comprising:

at least one processor; and a memory, wherein at least one processor is configured to:

input voice information into an encoder to extract a first feature vector and calculates a first loss function, input the first feature vector extracted from the encoder to a first decoder to perform prediction on the voice information, calculates a second loss function, and extracts a second feature vector, input a second feature vector extracted from the first decoder to a second decoder to perform grapheme-based prediction, and calculates a third loss function, and calculate a final loss function based on the first loss function, the second loss function, and the third loss function; and train at least one of the encoder, the first decoder, or the second decoder to decease the calculated final loss function.

11. A structure of a neural network model for speech recognition, the structure being implemented by a computing device, the structure of the neural network model comprising:

an encoder for receiving voice information and extracting a first feature vector for the voice information;

a first decoder for receiving the extracted first feature vector from the encoder, extracting a second feature vector, and performing a prediction on a letter in a unit larger than a grapheme unit for the voice information; and a second decoder for receiving the extracted second feature vector from the first decoder and performing a prediction in a grapheme unit on the voice information.

wherein the neural network model corresponds to a neural network model trained in consideration of a final loss function associated with the second decoder, the encoder, and the first decoder.

12. The structure of the neural network model of claim 11, wherein the encoder includes a convolution layer and a plurality of conformer layers, wherein the first decoder includes a plurality of transformer layers, and wherein the second decoder includes a plurality of transformer layers.

13. A speech recognition method performed by a computing device, the speech recognition method comprising:

extracting a first feature vector based on voice information by using an encoder of a pre- trained neural network model; and performing a prediction on the voice information based on the first feature vector extracted by the encoder by using a first decoder of the pre-trained neural network model, wherein the pre-trained neural network model corresponds to a neural network model pre-trained in consideration of a final loss function associated with a second decoder that performs a prediction in a grapheme unit, the encoder, and the first decoder.

* * * * *